2,942,005

RECOVERY OF PHTHALIC AND MALEIC ANHYDRIDES

David Brown and John White Colton, New York, and Robert B. Egbert, Roslyn Heights, N.Y., assignors, by mesne assignments, to Scientific Design Company, Inc., a corporation of Delaware No Drawing. Filed May 24, 1954, Ser. No. 432,058

4 Claims. (Cl. 260—346.4)

This invention relates to the recovery of polycarboxylic acid anhydrides from dilute gaseous mixtures thereof by a cyclic system of scrubbing the anhydrides from the gas by means of a liquid medium such as a dipropyl phthalate, stripping any maleic anhydride present from the resulting solution, then fractionally crystallizing phthalic anhydride therefrom, and recycling the medium to the scrubbing step.

In the production of the commercially important phthalic and maleic anhydrides by the catalytic oxidation of ortho-xylene with air or gaseous oxygen, there are produced certain undesirable impurities, including phthalide, the boiling points of which are very close to that of phthalic anhydride. In view thereof, the art is confronted by the problem of providing convenient and economic methods for recovering such maleic and phthalic anhydrides free from such impurities.

The discoveries associated with the invention and relating to the solution of the above problem, and the objects achieved in accordance with the invention as set forth herein include the following: a process for the recovery of both the maleic and phthalic anhydrides from an oxidation reactor effluent gas by passing this gas through an absorption system in contact with a liquid medium to absorb substantially all of the anhydrides, stripping the maleic anhydride from the resulting solution, then cooling the remainder and fractionally crystallizing the phthalic anhydride therefrom, substantially all of the phthalide and other impurities remaining in the solution, and recycling the solution to the absorber; such a process wherein a part of the lean absorbing medium is stripped or fractionated to remove phthalide as well as tars therefrom before recycling to the absorbing step, e.g., from about 5 to 45% thereof by volume; such a process wherein a low boiling liquid hydrocarbon such as a pentane or hexane is added as a non-solvent and vaporization cooling medium in the step of fractionally crystallizing the phthalic anhydride; such a process wherein a temperature gradient is maintained in the absorber such that the reactor effluent gas entering the bottom thereof, which may be at a temperature in the range of about 100 to 400° C., is cooled to a temperature in the range of about 60 to 125° C., substantially all of the phthalic anhydride being absorbed in the lower part of the absorber, and the minimum temperature in this zone being about 60° C.; substantially all the maleic anhydride being absorbed in the upper part of the absorber, and the temperature in this part being in the range of 10 to 80° C.; and other objects which will be apparent as details or embodiments of the invention are set forth hereinafter.

The recovery of maleic anhydride or phthalic anhydride from oxidation effluent reactor gases by means of dibutylphthalate, with recovery of the individual anhydrides from the resulting solutions by a series of stripping operations is disclosed in the Landau Patent No. 2,574,644, issued November 13, 1951.

In order to facilitate a clear understanding of the invention, the following preferred specific embodiments are described in detail.

Example 1

An oxidation reactor effluent mixture containing about one or two percent of phthalic anhydride; about one-fifth as much of maleic anhydride together with diluents and a small amount of phthalide or the like impurities is passed upwardly through an absorber in counter-current contact with a liquid dipropyl- or dibutyl-phthalate absorption medium. The absorber may be a cyclic tower of about 7½ feet in diameter and 63 feet in height containing about 30 trays. If desired, the absorber may be followed by a water scrubber to remove any residual anhydrides before venting the gases, e.g., a similar column of about 3 trays. The absorber is provided with one or more circulating coolers for drawing hot liquid from the bottom and circulating it to a point intermediate the bottom and top thereof; preferably one circulator-cooler which acts as a quench to cool the incoming hot gases, a bleed of rich liquor being drawn therefrom for recovery of absorbed materials, and one or more circulator-coolers for drawing liquid from some point in the column and cooling and re-introducing it at a somewhat higher point, so as to maintain the temperature gradient in the above mentioned ranges. The rich solvent liquor is passed to a stripper where maleic anhydride is removed therefrom by fractional distillation, and recovered. If desired, this maleic anhydride may be further purified by fractionation or other treatment as known in the art. For this operation, a cyclic column about five feet in diameter and 24 feet in height containing about ten trays may be used. It may be operated at a pressure of 23 mm. Hg at the top and 45 mm. at the bottom, the corresponding temperature being 97° C. at the top and 115° C. at the bottom. The stripping ratio therein may be 0.46, i.e., mols of liquid vapor relative to mol of downwardly flowing liquid.

An equivalent packed column may be used for each of the foregoing tray-type columns.

The resulting solution is cooled in a crystallizer, e.g. a vertical cyclic vessel having a conical bottom for removal of solids. The liquid may be cooled indirectly by means of a jacket, or by means of cooling coils in the vessel, or by introducing a non-solvent cooling medium, such as a petroleum ether or the like hydrocarbon having about 5 to 7 carbon atoms and boiling in the range of about 60 to 100° C. If desired, the system containing the cooling medium may be subjected to reduced pressure.

The resulting crystallized phthalic anhydride is withdrawn as a slurry from the crystallizer and passed to a ringer or filter wherein the crystals are separated and recovered. If desired, the phthalic anhydride product may be washed with a hydrocarbon of the above type, or it may be further refined or purified in known manner. The resulting lean liquor is stripped of added hydrocarbon, if any, and preferably about ⅓ of the liquor is fractionated to remove any phthalide as well as any tarry materials, the resulting lean liquir including the part which has been cleansed of phthalide and tar, is recirlated to the upper part of the absorber, preferably at a temperature in the range of about 30 to 50° C.

By properly regulating the flow rates in the absorber of gases and liquids, it is possible to recover substantially all the phthalic and maleic anhydrides in the reactor effluent gases. Preferably, the lean liquor rate should be in excess of 0.005 mol per mol of gas passing through the absorber, desirably in the range of 0.02 to 0.10 mol, and preferably in the range of 0.025 to 0.04 mol of liquor per mol of gas. The temperature gradient in the absorber should be such that the lower or phthalic anhydride absorption zone never gets so cool as to separate out solid phthalic anhydride therein.

The recycled liquor should not contain over about one percent of maleic anhydride, preferably not over about 0.1 percent. However, it may contain up to about 40 mol percent of phthalic anhydride, preferably below about 15%; the rich liquor or bottom may contain about 5 to 50 mol percent phthalic anhydride, and economical operation concentration is about 25 mol percent.

The phthalide and other impurities may be allowed to build up in the recycled liquor so that the excess thereof is not absorbed therein or in other words, passed off with the vent gases from the absorber. In this way the special purification of recycled liquor may be minimized. However, the amounts of phthalide and the like impurities should not be so high as to interfere with the recovery of the phthalic anhydride crystals.

Desirable or comparable results to the foregoing are achieved with various modifications within the ranges as set forth hereinabove.

Variations and modifications of the invention will be apparent to one skilled in the art in view of the foregoing disclosures, and it is intended to include within the invention all such variations and modifications except as do not come within the scope of the appended claims.

We claim:

1. In the process of recovering phthalic anhydride from mixtures thereof containing maleic anhydride and phthalide produced by catalytic oxidation of ortho-xylene wherein said mixtures in gaseous state are contacted with a lean dibutyl phthalate solution to form a rich solution, maleic anhydride is stripped from the rich solution and phthalide is subsequently stripped from the solution, after removal of phthalic anhydride, to form a lean solution for recycle to the contacting step, the improved method of operation which comprises cooling dibutyl phthalate solution which is rich in phthalic anhydride and phthalide to a temperature effective for crystallizing substantially pure phthalic anhydride while retaining the phthalide in mother liquor and separating phthalic anhydride in crystal form from said mother liquor.

2. A process for recovering maleic and phthalic anhydrides from a phthalide-containing oxidation reactor effluent gas mixture which comprises the steps of contacting said gas mixture with a solvent selected from the class consisting of dipropyl phthalate and dibutyl phthalate to form a solution containing said anhydrides, stripping maleic anhydride from said solution, cooling the resulting solution to a temperature effective for fractionally crystallizing phthalic anhydride and removing therefrom phthalic anhydride substantially free from phthalide, stripping a portion of the phthalide from the resulting lean liquor, and recycling said lean liquor to said contacting step.

3. A process for recovering maleic and phthalic anhydride from a phthalide-containing oxidation reactor effluent gas mixture which comprises the steps of contacting said gas mixture with dipropyl phthalate to form a solution containing said anhydrides, stripping maleic anhydride from said solution, cooling the resulting solution to a temperature effective for fractionally crystallizing phthalic anhydride and removing therefrom phthalic anhydride substantially free from phthalide, stripping phthalide from a portion of the resulting lean liquor, and thereafter recycling said lean liquor to said contacting step.

4. A process for recovering maleic and phthalic anhydride from a phthalide-containing oxidation reactor effluent gas mixture which comprises the steps of contacting said gas mixture with dibutyl phthalate to form a solution containing said anhydrides, stripping maleic anhydride from said solution, cooling the resulting solution to a temperature effective for fractionally crystallizing phthalic anhydride and removing therefrom phthalic anhydride substantially free from phthalide, stripping a portion of the contained phthalide in the resulting lean liquor, and recycling said liquor to said contacting step.

References Cited in the file of this patent

UNITED STATES PATENTS

| | | |
|---|---|---|
| 1,301,388 | Conover | Apr. 22, 1919 |
| 1,895,522 | Punnett | Jan. 31, 1933 |
| 2,129,166 | Crowell | Sept. 6, 1938 |
| 2,140,140 | Punnett | Dec. 13, 1938 |
| 2,302,888 | Porter | Nov. 24, 1942 |
| 2,574,644 | Landau | Nov. 13, 1951 |

FOREIGN PATENTS

| | | |
|---|---|---|
| 989,559 | France | Sept. 11, 1951 |